(12) United States Patent
Gunalan et al.

(10) Patent No.: US 10,979,351 B2
(45) Date of Patent: Apr. 13, 2021

(54) MANAGING ROUTING TABLES

(71) Applicant: Cisco Technology, Inc., San Jose, CA (US)

(72) Inventors: Anbu Chezhian Gunalan, San Jose, CA (US); Ramanathan Lakshmikanthan, Santa Clara, CA (US); Jose Antonio Liste, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 325 days.

(21) Appl. No.: 15/980,659

(22) Filed: May 15, 2018

(65) Prior Publication Data
US 2018/0337852 A1    Nov. 22, 2018

Related U.S. Application Data

(60) Provisional application No. 62/508,914, filed on May 19, 2017.

(51) Int. Cl.
| *H04L 12/741* | (2013.01) |
| *H04L 12/723* | (2013.01) |
| *H04L 12/755* | (2013.01) |
| *H04L 12/721* | (2013.01) |
| *H04L 12/751* | (2013.01) |
| *H04L 12/935* | (2013.01) |
| *H04L 12/803* | (2013.01) |

(52) U.S. Cl.
CPC ............ *H04L 45/54* (2013.01); *H04L 45/021* (2013.01); *H04L 45/14* (2013.01); *H04L 45/50* (2013.01); *H04L 45/507* (2013.01); *H04L 45/745* (2013.01); *H04L 45/02* (2013.01); *H04L 47/125* (2013.01); *H04L 49/3009* (2013.01)

(58) Field of Classification Search
None
See application file for complete search history.

(56) References Cited

U.S. PATENT DOCUMENTS

| 10,498,641 | B2* | 12/2019 | Yin | .................. H04L 45/02 |
| 2008/0107114 | A1* | 5/2008 | Liu | .................. H04L 45/00 370/392 |
| 2010/0080190 | A1* | 4/2010 | Berzin | ............. H04W 36/0011 370/331 |

(Continued)

*Primary Examiner* — Hassan A Phillips
*Assistant Examiner* — Gautam Sharma
(74) *Attorney, Agent, or Firm* — Merchant & Gould P.C.

(57) ABSTRACT

A method for managing routing tables and data packet forwarding is disclosed. The method comprises obtaining, at a networking device, a first outgoing label associated with one or more output port identifiers of the networking device. The first outgoing label identifies a first destination node. The one or more output port identifiers identify one or more of a plurality of output ports. The method further comprises determining whether or not the one or more output port identifiers are also associated with a second outgoing label. The second outgoing label identifies a second destination node different from the first destination node. The method further comprises merging, into a next hop table allocated in a non-transitory memory, the first outgoing label with the second outgoing label in response to determining that the one or more output port identifiers are also associated with the second outgoing label.

20 Claims, 11 Drawing Sheets

(56) References Cited

U.S. PATENT DOCUMENTS

| | | | |
|---|---|---|---|
| 2010/0080235 A1* | 4/2010 | Yamate | H04L 45/54 370/395.31 |
| 2010/0296517 A1* | 11/2010 | Kompella | H04L 12/44 370/408 |
| 2011/0075673 A1* | 3/2011 | Hardie | H04L 45/42 370/401 |
| 2011/0224892 A1* | 9/2011 | Speiser | G08G 1/01 701/118 |
| 2015/0326675 A1* | 11/2015 | Kini | H04L 43/10 709/224 |
| 2016/0285760 A1* | 9/2016 | Dong | H04L 49/354 |
| 2017/0070427 A1* | 3/2017 | Zeng | H04L 45/54 |
| 2018/0324097 A1* | 11/2018 | Liu | H04L 45/00 |
| 2018/0351857 A1* | 12/2018 | Vairavakkalai | H04L 45/26 |

* cited by examiner

MANAGING ROUTING TABLES

RELATED APPLICATION

This application claims the benefit of U.S. Provisional Patent Application No. 62/508,914 filed on May 19, 2017, the disclosure of which is hereby expressly incorporated by reference in its entirety.

TECHNICAL FIELD

The present disclosure relates generally to networking, and in particular, managing scarce or limited recourses on a networking device.

BACKGROUND

Networking devices often use routing tables in order to facilitate traffic forwarding. In the control plane, certain current systems store label tables identifying next hop nodes using identifiers for nodes to which traffic can be directed. In certain systems, each label table includes next hop addressing information corresponding to a separate destination node. The labels or versions thereof in turn are used by next hop tables.

BRIEF DESCRIPTIONS OF THE FIGURES

For a better understanding of aspects of the various embodiments described herein and to show more clearly how they may be carried into effect, reference is made, by way of example only, to the accompanying drawings.

Figure 1:
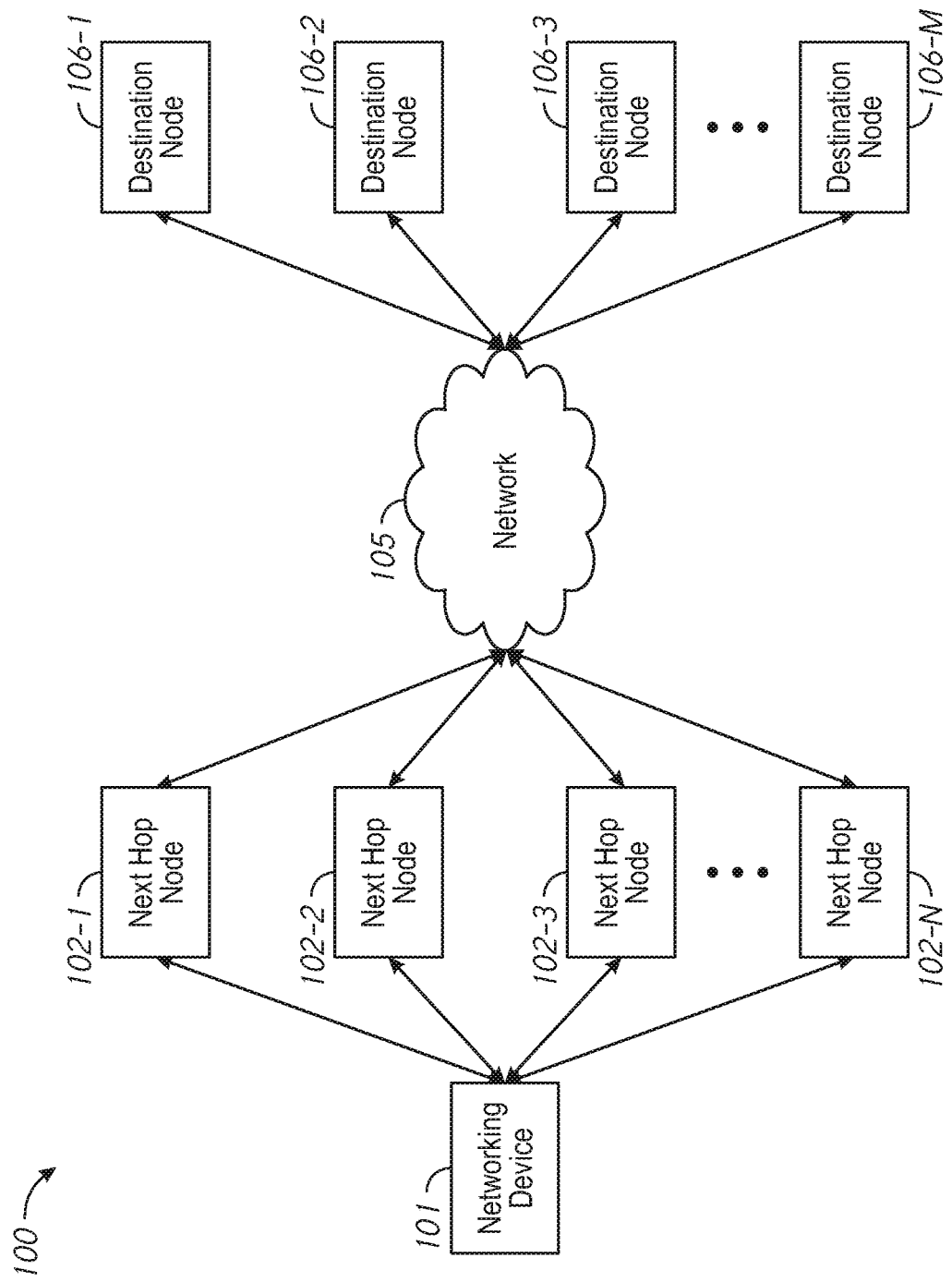
FIG. 1 is an illustration of a simplified diagram of a network environment according to various embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative embodiments shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the embodiments described herein.

Overview

Various embodiments disclosed herein include apparatuses, systems, and methods for managing storage space allocation for routing tables and data packet forwarding. These apparatuses, systems, and methods ameliorate and/or resolve numerous technical problems. Chief among them is reducing utilization of a resource-limited next hop table allocated in memory by avoiding storage of duplicative addressing information therein.

The method comprises obtaining, at a networking device, a first outgoing label associated with one or more output port identifiers of the networking device. The first outgoing label identifies a first destination node. The one or more output port identifiers identify one or more of the plurality of output ports. The method comprises determining whether or not the one or more output port identifiers are also associated with a second outgoing label. The second outgoing label identifies a second destination node different from the first destination node. The method comprises merging, into a next hop table allocated in the non-transitory memory, the first outgoing label with the second outgoing label in response to determining that the one or more output port identifiers are also associated with the second outgoing label. The merging reduces utilization of the non-transitory memory by the next hop table by reducing duplication of the one or more output port identifiers.

In accordance with some embodiments, a networking device includes one or more processors, a non-transitory memory, and one or more programs. The one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a networking device, cause the networking device to perform or cause performance of any of the methods described herein. In accordance with some embodiments, a networking device includes: one or more processors, a non-transitory memory, and means for performing or causing performance of any of the methods described herein.

Example Embodiments

In general, certain networking devices (e.g., router, switch, gateway node, and the like) forward data based on routing information stored in one or more routing tables. The routing tables are allocated within a memory resource at the networking device. In a label-based routing scheme, the routing tables can include one or more label tables and a next hop table.

However, previous label-based routing deployments utilize resources inefficiently in managing memory allocation and storage of routing information. For example, in certain networks, such as multiprotocol label switching (MPLS) networks, a networking device uses knowledge of downstream labels. Previously, each downstream label was stored as a separate entry in the routing table(s) (e.g., the next hop table) for each output port identifier associated with every destination node. This approach can quickly exhaust the memory allocation for the next hop table, and in turn limits the number of addressable next hop nodes and/or destination nodes. Moreover, under an equal-cost multi-path (ECMP) routing scheme, the specified number of entries is relatively high because ECMP generally specifies multiple equal-cost paths. This further reduces the number of addressable nodes.

The memory resources associated with the next hop table are limited and expensive. This is especially problematic because, as described above, current systems inefficiently store routing information in the next hop table. For example, the next hop table used to store addressing information corresponding to next hop nodes is silicon-limited. Due to price constraints, previous networking devices utilizing ECMP contain a next hop table capable of storing, for example, only a few thousand entries. Accordingly, the next hop table can store routing information for a relatively few number of next hop and destination nodes. Therefore, a more efficient technique for managing routing tables, including label tables and next hop tables, would be useful. Such a technique allows the networking device to route data packets to more next hop and destination nodes.

To more efficiently utilize this resource-limited next hop table, the present disclosure provides systems, methods, and apparatuses directed to more efficient management of routing tables at a networking device. To that end, features of segment routing are exploited according to various embodiments. Segment routing is based on source routing wherein a networking device specifies one or more segments through which packets travel to respective destinations nodes. One feature of segment routing is that a common label (e.g., an outgoing label) can identify one or more next hop nodes that provide paths to a particular destination node. In various embodiments, the networking device obtains the outgoing label from a destination node through various networking nodes, such as spine and/or leaf nodes. The outgoing label is associated with one or more output port identifiers identifying one or more output ports that couple the networking device to respective next hop nodes. Accordingly, the networking device need not know the identities of nodes that are further downstream. In various embodiments, the networking device merges into a next hop table outgoing labels associated with the same one or more output port identifiers. This reduces utilization of the next hop table, allowing for more next hop entries to be stored and consequently more next hop nodes and destination nodes to be sent data packets. Accordingly, in various embodiments, outgoing labels are merged as a function of output port identifiers and their corresponding outgoing labels. This increases scalability, operational simplicity, distributed network intelligence, and/or programmability for the networking device.

In various embodiments, the networking device includes a label table and a next hop table allocated in a memory, such as a non-transitory memory. The label table exists in the control plane and stores addressing information, such as one or more labels. The addressing information is sent to the forwarding plane (e.g., the data plane). The next hop table exists in the forwarding plane. The next hop table stores addressing information to facilitate forwarding of data packets to the next hop nodes. The forwarding plane can include forwarding information base (FIB) and label forwarding information base (LFIB) resources. The FIB maps media access control (MAC) addresses to ports via a dynamic table constructed from the information in the routing table. The egress of the FIB can be IP packets and/or labeled packets. The LFIB is built from the FIB and a label information base (LIB) table at the control plane. The LFIB is used to forward labeled packets to the egress interface.

In various embodiments, the networking device merges outgoing labels into the next hop table in a multi-protocol label switching (MPLS) deployment. MPLS is a packet-forwarding technology that uses labels for addressing the next hop nodes in order to make data forwarding decisions. Data is directed from one networking node to the next based on short paths rather than full network addresses (e.g., IP addresses), avoiding the complex procedure of looking up the network addresses. Moreover, because segment routing uses label switching to forward packets, segment routing can work in conjunction with MPLS-capable devices without having to without having to update configuration information with respect to the forwarding plane.

In various embodiments, an MPLS deployment uses label-switched paths (LSPs) to facilitate data forwarding. The LSP information can be generated based on a signaling protocol such as label distribution protocol (LDP), resource reservation protocol-traffic engineering (RSVP-TE), border gateway protocol (BGP), constraint-based routing label distribution protocol (CR-LDP), open shortest path first (OSPF), and/or intermediate system to intermediate system (IS-IS). In some embodiments, an LSP can be generated based on criteria in a Forward Equivalence Class (FEC). FEC specifies that packets with similar and/or identical characteristics may be forwarded in the same way. For example, packets bound to the same label can be forwarded in the same way.

In various embodiments, MPLS labels (e.g., global MPLS labels) are transported between gateways, according to, for instance, an interior gateway protocol (IGP) with segment routing extensions. In some embodiments, for example, border gateway protocol-labeled unicast (BGP-LU) provides MPLS transport across an IGP boundary in order to advertise global labels associated with destination nodes. In some embodiments, BGP-LU can be used to advertise global labels identifying the destination nodes in order to allow loopback inside the fabric of the networking device.

In various embodiments, the networking device can utilize load-balancing routing techniques in conjunction with label-based routing techniques, such as MPLS. For example, in some embodiments, the networking device utilizes ECMP, a load-balancing routing technique. ECMP specifies equal-cost paths to a particular destination node. The cost of each path can be determined based on routing metric calculations. According to various embodiments, a next hop table includes addressing information identifying next hop nodes lying on equal cost paths to a destination node. ECMP provides the advantage of splitting traffic throughout the network, leading to less congestion and thereby increasing bandwidth. ECMP is often critical for operators building scale-out and redundant networks.

In various embodiments, the networking device merges outgoing labels into the next hop table in an ECMP deployment. For example, in various embodiments, two or more outgoing labels identify next hop nodes providing equal-cost paths to a particular destination node. Continuing with this example, the networking device merges the two or more outgoing labels into the next hop table in response to determining that the two or more outgoing labels are associated with the same one or more output port identifiers of the networking device.

Example Embodiments

FIG. 1 is an illustration of a simplified diagram of a network environment 100 according to various embodiments. The network environment exploits segment routing in order to enable merging of labels into the next hop table. In various embodiments, the networking environment 100 operates in accordance with segment routing. In various embodiments, the networking environment 100 operates in accordance with MPLS and/or ECMP.

The networking environment 100 includes a networking device 101. The networking device 101 includes a processor, a non-transitory memory, and a plurality of output ports. In various embodiments, the networking device 101 includes one or more integrated circuits, such as a field programmable gate array (FPGA) and/or application specific integrated circuit (ASIC). The networking device 101 can be coupled to any number of next hop nodes, such as next hop nodes 102-1 through 102-N. In some embodiments, some or all of the next hop nodes 102-1 through 102-N correspond to spine nodes, leaf nodes, or a combination thereof.

The networking device 101 includes a next hop table allocated in the non-transitory memory. In various embodiments, the next hop table includes address information corresponding to output port identifiers associated with outgoing labels for certain destination node(s). As is further detailed in this disclosure, in populating the next hop table the networking device 101 merges certain outgoing labels, thereby reducing utilization of the resource-limited next hop table.

In various embodiments, control plane signaling at the networking device 101 includes the networking device 101 obtaining and storing outgoing labels identifying destination nodes. In the control plane, segment routing introduces new semantics in order to allow the networking device 101 to allocate the same output label for multiple output ports. In various embodiments, outgoing labels are obtained from destination nodes 106-1 through 106-M. In various embodiments, the networking device 101 stores the outgoing labels in a label table allocated in the non-transitory memory. In some embodiments, the label table corresponds to an incoming label map (ILM). In various embodiments, the networking device 101 associates outgoing labels with output port identifiers identifying output ports of the networking device 101.

With respect to data plane signaling, in various embodiments, the networking device 101 forwards data packets through output ports to one or more of the next hop nodes 102-1 through 102-N. In various embodiments, the networking device 101 forwards a data packet based on information stored in the next hop table.

Figure 2A:
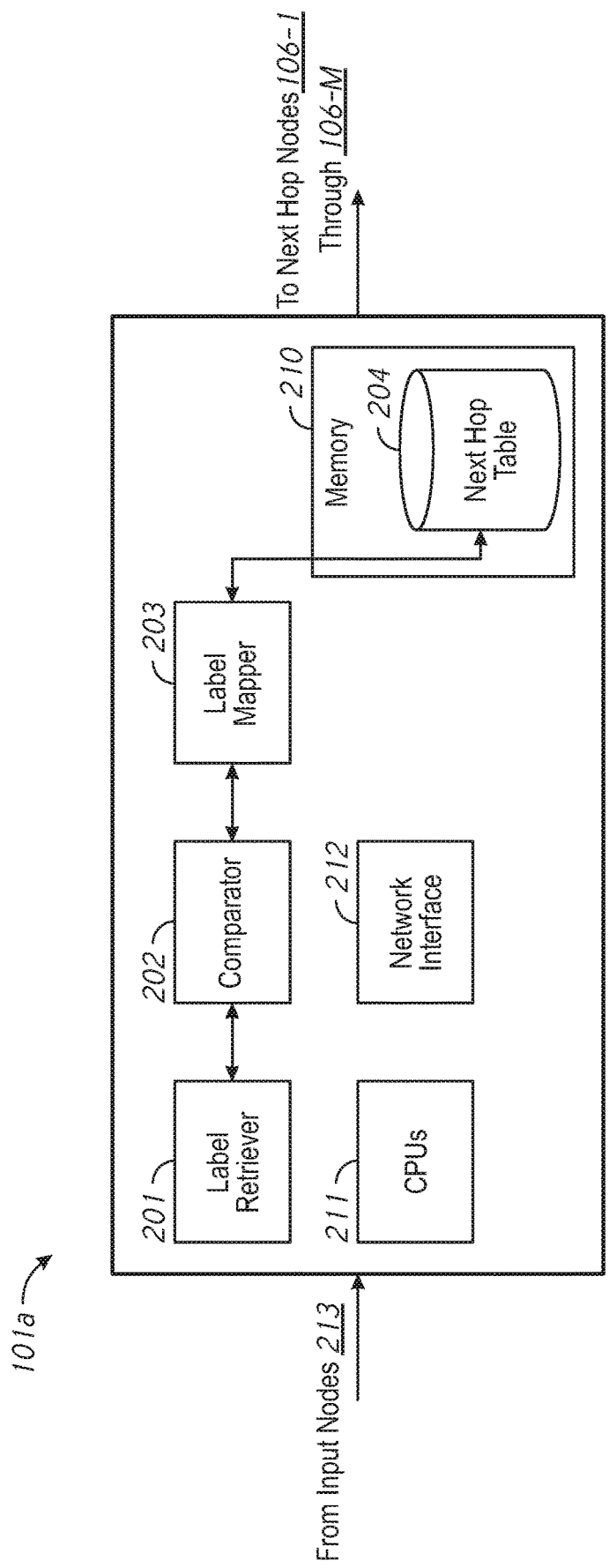
FIGS. 2A and 2B are illustrations of pertinent aspects of networking devices according to various embodiments.

FIG. 2A is an illustration of pertinent aspects of a networking device 101a according to various embodiments. The networking device 101a corresponds to an embodiment of the networking device 101 in FIG. 1. However, one of ordinary skill in the art will appreciate that the networking device 101a may correspond to any data-forwarding networking node, such as a next hop node (e.g., 102-1 through 102-N in FIG. 1), a destination node (e.g., 106-1 through 106-M in FIG. 1), and/or any node in the network 105 in FIG. 1 (not shown). The networking device 101a obtains input traffic from one or more input nodes 213 (e.g., gateway, switch, router, etc.) and provides outgoing traffic to one or more of the next hop nodes 106-1 through 106-M.

The networking device 101a includes a network interface 212. The network interface 212 obtains input traffic from one or more input nodes 213 (e.g., gateway, switch, router, etc.). For example, the network interface 212 receives data packets from an Access Point. The network interface provides outgoing traffic to one or more of the next hop nodes 106-1 through 106-M. For example, the network interface 212 outputs data packets to the next hop node 106-4.

The networking device 101a includes a label retriever 201. The label retriever 201 retrieves (e.g., obtains) a first outgoing label associated with one or more output port identifiers of the networking device. The first outgoing label identifies a first destination node. The one or more output port identifiers identify one or more of a plurality of output ports of the networking device 101a. In various embodiments, the one or more of the plurality of output ports couple the networking device 101a to one or more respective next hop nodes. In various embodiments, each respective next hop node is part of an equal-cost multi-path (ECMP) to a destination node.

In various embodiments, the label retriever 201 retrieves outgoing labels from destination nodes through next hop nodes. In various embodiments, the destination nodes are configured for and/or operating according to segment routing. For example, in some embodiments, the destination nodes advertise outgoing labels according to IGP and/or BGP-LU, which are facilitated by segment routing.

The networking device 101a includes a comparator 202. The comparator 202 determines whether or not the one or more output port identifiers are also associated with a second outgoing label. The second outgoing label identifies a second destination node different from the first destination node. In various embodiments, the first and second outgoing labels share a label value.

The networking device 101a includes a label mapper 203. The label mapper 203 merges, into a next hop table 204 allocated in memory 210 (e.g., a non-transitory memory), the first outgoing label with the second outgoing label in response to determining that the one or more output port identifiers are also associated with the second outgoing label. Merging reduces utilization of the non-transitory memory by the next hop table 204 by reducing duplication of the one or more output port identifiers. In various embodiments, the label mapper 203 maps entries of a label table to entries of the next hop table 204. In various embodiments, the label mapper 203 stores, in the next hop table 204, address information corresponding to the one or more output port identifiers associated with the first outgoing label. In various embodiments, the label mapper 203 stores, in the next hop table 204, address information corresponding to one or more output port identifiers associated with the second outgoing label. Although the next hop table 204 is depicted as a single entity, one of ordinary skill in the art will appreciate that the networking device 101a can allocate numerous tables (e.g., memory locations) in the memory 210 for the next hop table 204, as is exemplified in FIG. 5. The label mapper 203 maps outgoing labels according to a merging or non-merging technique, as will be further detailed with respect to FIG. 5. As is further detailed in this disclosure, whether the label mapper 203 merges or does not merge outgoing labels depends on the output port identifiers associated with the outgoing labels.

The networking device 101a includes one or more processing units (CPUs) 211. The one or more CPUs 211 facilitate the processing of various features of the networking device 101a. In various embodiments, the one or more CPUs 211 facilitate the processing of one or more of the label retriever 201, the comparator 202, or the label mapper 203.

Figure 2B:
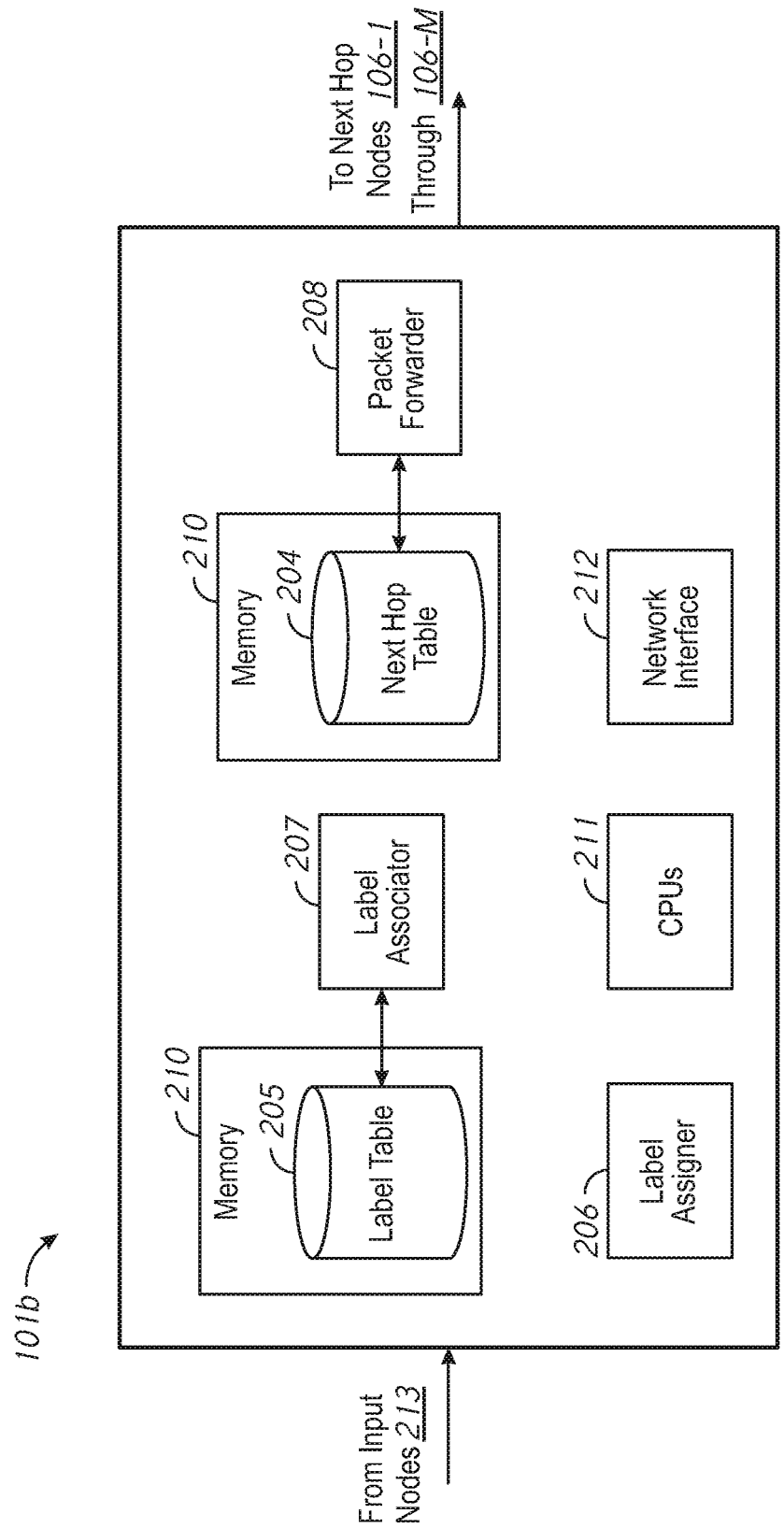

FIG. 2B is an illustration of pertinent aspects of a networking device 101b according to various embodiments. The networking device 101b corresponds to an embodiment of the networking device 101 in FIG. 1. However, one of ordinary skill in the art will appreciate that the networking device 101b may correspond to any data-forwarding networking node, such as a next hop node (e.g., 102-1 through 102-N in FIG. 1), a destination node (e.g., 106-1 through 106-M in FIG. 1), and/or any node in the network 105 in FIG. 1 (not shown).

The networking device 101*b* includes a network interface 212. The network interface 212 obtains input traffic from one or more input nodes 213 (e.g., gateway, switch, router, etc.). For example, the network interface 212 receives data packets from a router. The network interface provides outgoing traffic to one or more of the next hop nodes 106-1 through 106-M. For example, the network interface 212 outputs data packets to the next hop node 106-3.

In various embodiments, the networking device 101*b* includes a label table 205. The label table 205 is allocated in memory 210 (e.g., a non-transitory memory) of the networking device 101*b*. Although the label table 205 is depicted as a single entity, one of ordinary skill in the art will appreciate that the networking device 101*b* can allocate numerous tables (e.g., memory locations) in the memory 210 for the label table 205, as exemplified in FIG. 5.

In various embodiments, the networking device 101*b* includes a label assigner 206. In various embodiments, the label assigner 206 assigns (e.g., stores in the label table 205) a local label that identifies a respective next hop node and a respective destination node. In various embodiments, the local label is different from a corresponding outgoing label that identifies the respective next hop node. In various embodiments, the local label is the same as a corresponding outgoing label that identifies the respective next hop node. In various embodiments, the networking device 101*b* uses the local label in making data packet-forwarding decisions.

In various embodiments, the networking device 101*b* includes a label associator 207 that associates outgoing labels stored in the label table 205. The label associator 207 associates the first outgoing label with the one or more output ports identifiers identifying the one or more output ports of the networking device 101*b*. In various embodiments, the outgoing labels are associated in accordance with segment routing and/or source routing.

In various embodiments, the label associator 207 associates outgoing labels in accordance with MPLS. For example, with reference to FIGS. 1 and 2A, the label retriever 201 obtains an outgoing label from the destination node 106-2. Continuing with the example, the label associator 207 associates the outgoing label with output port identifiers identifying output ports coupled to next hop nodes that are part of MPLS label-switched paths (LSPs) to the destination node 106-2.

In various embodiments, the label associator 207 associates outgoing labels in accordance with ECMP. For example, with reference to FIGS. 1 and 2A, the next hop node 102-1 and the next hop node 102-2 can lie on equal-cost paths to destination node 106-2. Continuing with the example, the label retriever 201 obtains an outgoing label from the destination node 106-2. Continuing with the example, the label associator 207 associates the outgoing label with output port identifiers identifying output ports that couple the networking device 101*b* to the next hop node 102-1 and the next hop node 102-2.

In various embodiments, the networking device 101*b* includes a packet forwarder 208. In various embodiments, the packet forwarder 208 receives a first data packet associated with the first outgoing label and receives a second data packet associated with the second outgoing label.

In various embodiments, the packet forwarder 208 identifies, from the next hop table 204, a set of one or more output port identifiers associated with both the first outgoing label and the second outgoing label. In various embodiments, the packet forwarder 208 forwards the first data packet and the second data packet through one or more of the plurality of output ports corresponding to the set of one or more output port identifiers associated with both the first outgoing label and the second outgoing label.

In various embodiments, the packet forwarder 208 identifies, from the next hop table 204, a first set of one or more output port identifiers associated with the first outgoing label and a second set of one or more output port identifiers associated with the second outgoing label. In various embodiments, the packet forwarder 208 forwards the first data packet through one or more of the plurality of output ports corresponding to the first set of one or more output port identifiers associated with the first outgoing label. In various embodiments, the packet forwarder 208 forwards the second data packet through one or more of the plurality of output ports corresponding to the second set of one or more output port identifiers associated with the second outgoing label.

The networking device 101*b* includes one or more processing units (CPUs) 211. The one or more CPUs 211 facilitate the processing of various features of the networking device 101*b*. In various embodiments, the one or more CPUs 211 facilitate the processing of one or more of the label assigner 206, the label associator 207, or the packet forwarder 208

Figure 3:
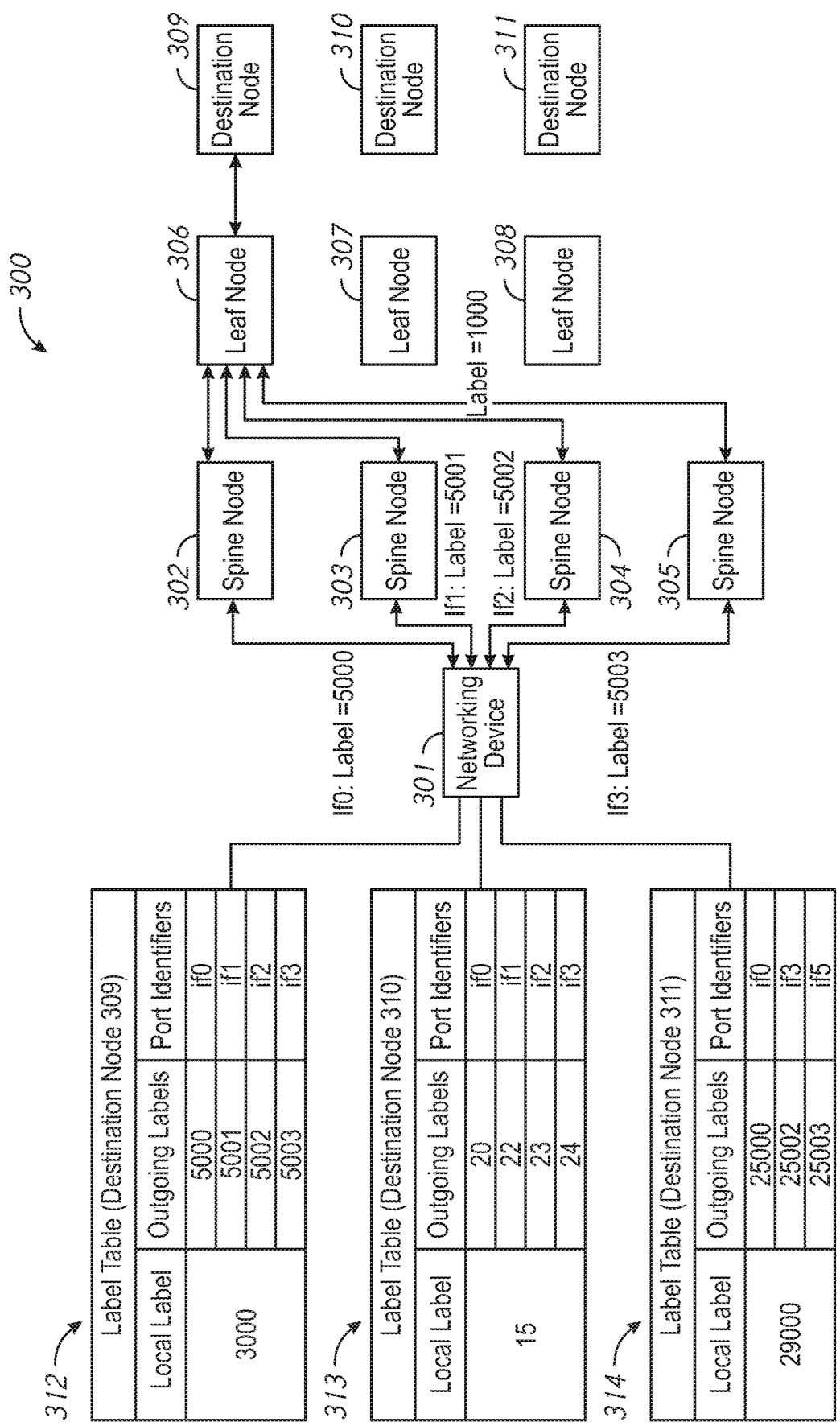
FIG. 3 is an illustration of a spine-leaf network environment.

FIG. 3 is an illustration of a spine-leaf network environment 300. The environment 300 includes a networking device 301 that forwards data packets to spine nodes 302-305, which then forward the data packets to leaf nodes 306-308, which then forward the packets to destination nodes 309-311. One of ordinary skill in the art will appreciate that the environment 300 can include more or fewer spine nodes, leaf nodes, and/or destination nodes. Connections between various nodes in FIG. 3 are omitted for the sake of clarity.

The destination nodes 309-311 are not segment routing compatible. For example, in a BGP-based spine-leaf fabric, the destination nodes 309-311 do not advertise global label values according to border gateway protocol segment routing extensions (BGP-SR). Accordingly, the destination nodes 309-311 do not advertise labels according to border gateway protocol (BGP). As a result, the spine nodes 302-305, after obtaining labels from destination nodes 309-311, advertise locally assigned labels to the networking device 301. As depicted in FIG. 3, the spine nodes 302-305 respectively advertise independent locally assigned labels having values of 5000-5003 to the networking device 301. These labels are stored in a label table 312. Although the connections are not depicted for the sake of clarity, the networking device 301 also obtains independently-allocated local labels from destination nodes 310 and 311 through the spine-leaf nodes and stores the labels in label tables 313 and 314, respectively.

As is further described below with reference to FIG. 4, this deployment is problematic. Because the networking device 301 does not exploit segment routing, it cannot obtain and utilize global labels. Instead, the networking device 301 obtains locally assigned labels. This leads to duplication when entries from the label tables are provided to a next hop table that facilitates packet routing. Accordingly, the number of addressable nodes to which one or more packets can be routed is limited.

Figure 4:
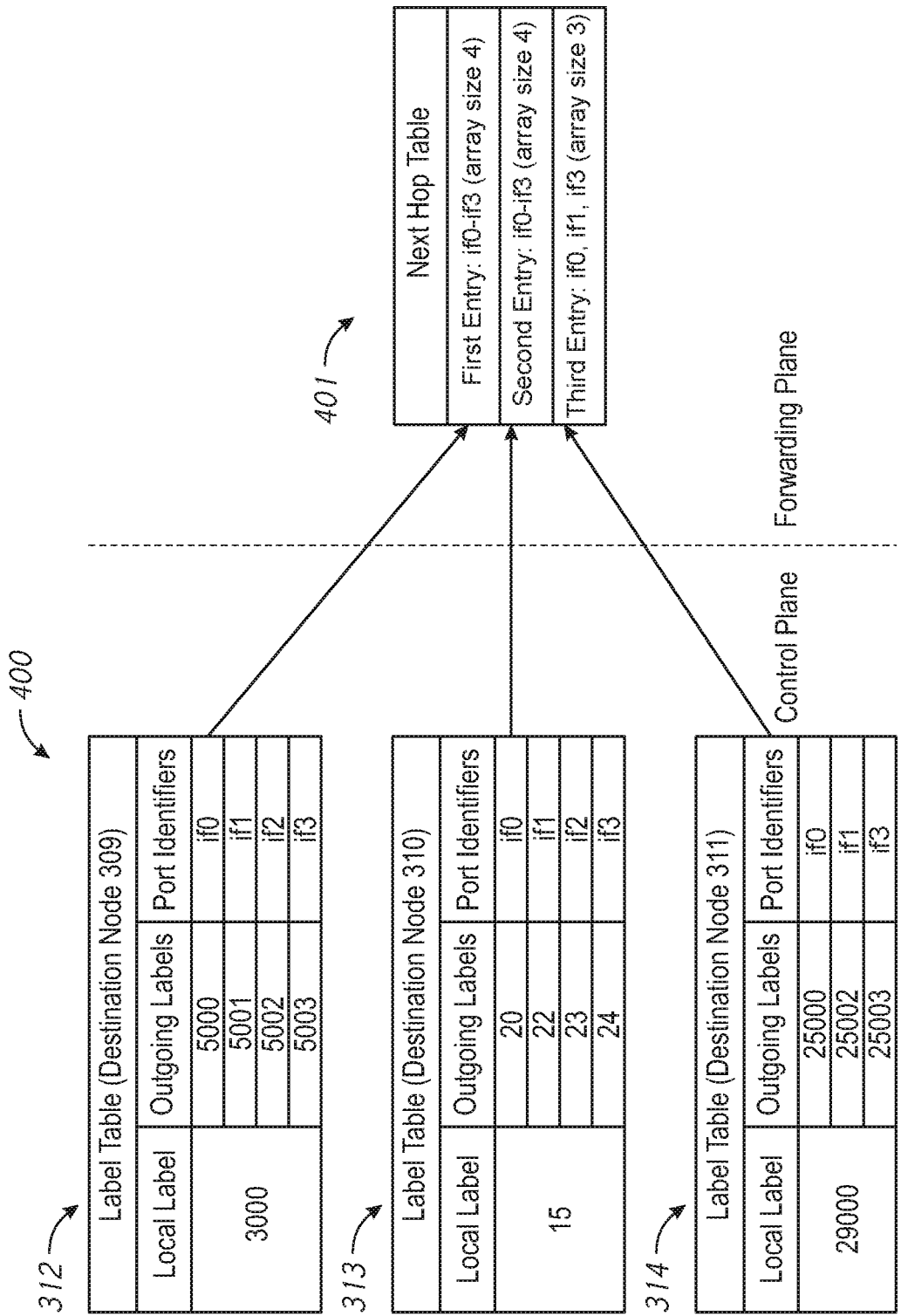
FIG. 4 is an illustration of pertinent aspects of populating a routing table in accordance with various embodiments.

FIG. 4 is an illustration 400 of pertinent aspects of populating a routing table. The illustration 400 includes three label tables 312-314 and a next hop table 401. Label table 312 provides addressing information for destination node 309. Label table 312 includes outgoing labels with values of 5000-5003 corresponding to output port identifiers if0-if3, respectively. The label table 312 further includes a local label with a value of 3000. Label table 313 provides addressing information for destination node 310. Label table 313 includes outgoing labels with values of 20, 22, 23, and 24 corresponding to output port identifiers if0-if3, respectively. The label table 313 further includes a local label with a value of 15. Label table 314 provides addressing information for destination node 311. Label table 314 includes outgoing labels with values of 25000, 25002, and 25003 corresponding to output port identifiers if0, if1, and if3, respectively. The label table 314 further includes a local label with a value of 29000.

Shown in the illustration 400 is a one-to-one mapping between addressing information in label tables 312-314 and addressing information in the next hop table 401. The four outgoing labels (5000-5003) stored in label table 312 are mapped to a first entry in the next hop table 401. The first entry corresponds to an array size of four based on output port identifiers if0-if3. Moreover, the four outgoing labels (20, 22, 23, and 24) stored in label table 313 are mapped to a second entry in the next hop table 401. The second entry corresponds to an array size of four based on output port identifiers if0-if3. Moreover, the three outgoing labels (25000, 25002, and 25003) stored in label table 314 are mapped to a third entry in the next hop table 401. The third entry corresponds to an array size of three based on output port identifiers if0, if1, and if3. Accordingly, each destination node identifier takes up an entry in the next hop table 401. This is problematic because the resource-limited next hop table 401 is populated with a needlessly large number of entries, leading to a limited number of addressable next hop nodes and destination nodes.

Figure 5:
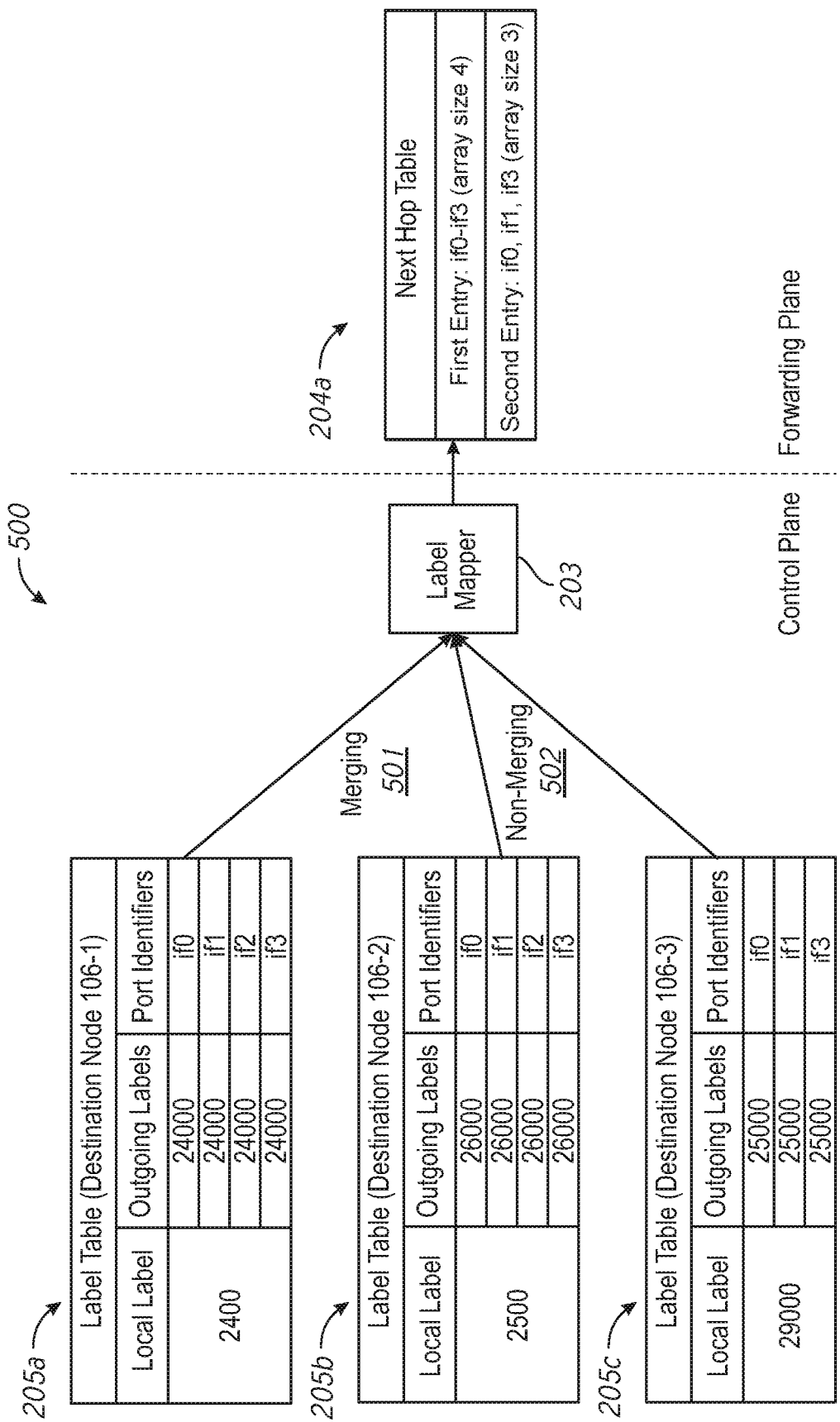
FIG. 5 is an illustration of pertinent aspects of label mapping according to various embodiments.

FIG. 5 is an illustration 500 of pertinent aspects of label mapping according to various embodiments. Unlike the illustration 400 in FIG. 4, the amount of addressing information stored in the next hop table is compressed, as shown in the illustration 500. The operation of the label mapper 203 mapping labels between label tables (e.g., the label table 205 in FIG. 2B) and a next hop table (e.g., next hop table 204 in FIGS. 2A and 2B) is shown in the illustration 500.

Mapping is the process of providing (e.g., programming) address information stored in label tables to a next hop table. The label mapper 203 maps according to merging and non-merging mechanisms. Merging corresponds to the label mapper 203 populating the next hop table with less addressing information than was provided by the label tables. Non-merging corresponds to the label mapper 203 populating the next hop table with the same amount of addressing information as was provided by the label tables.

Shown in the illustration 500 are three label tables 205a-205c and a next hop table 204a. One of ordinary skill in the art will appreciate that the networking device can allocate more or fewer label tables and/or next hop tables in non-transitory memory. Moreover, one of ordinary skill in the art will appreciate that the values of the label tables 205a-205c and/or the values of the next hop table 204a can differ.

The label table 205a provides addressing information for destination node 106-1. The label table 205a includes outgoing labels with values of 2400 corresponding to output port identifiers if0-if3. The label table 205a further includes a local label with a value of 2400.

The label table 205b provides addressing information for the destination node 106-2. The label table 205b includes outgoing labels with values of 26000 corresponding to output port identifiers if0-if3. The label table 205b further includes a local label with a value of 2500.

The label table 205c provides addressing information for the destination node 106-3. The label table 205c includes outgoing labels with values of 25000 corresponding to output port identifiers if0, if1, and if3. The label table 205c further includes a local label with a value of 29000.

One of ordinary skill in the art will appreciate that the outgoing label entries and/or local label entries for a particular label table can differ.

The label mapper 203 maps entries of the label tables 205a-205c into entries of the next hop table 204a. The label mapper 203 merges, at 501, the outgoing labels 24000 of the label table 205a and the outgoing labels 26000 of the label table 205b into the next hop table 204a, in response to determining that these outgoing labels are associated with the same output port identifiers if0-if3. Accordingly, the utilization of the next hop table 204a is because the number of entries is reduced from three in next hop table 401 in FIG. 4 to two in next hop table 204a in FIG. 5. In other words, the utilization of the next hop table 204a is reduced because duplication of the output port identifiers is avoided. On the other hand, the label mapper 203 does not merge, at 502, the outgoing label 25000 of the label table 205c because it is associated with a different set of output port identifiers.

Figure 6:
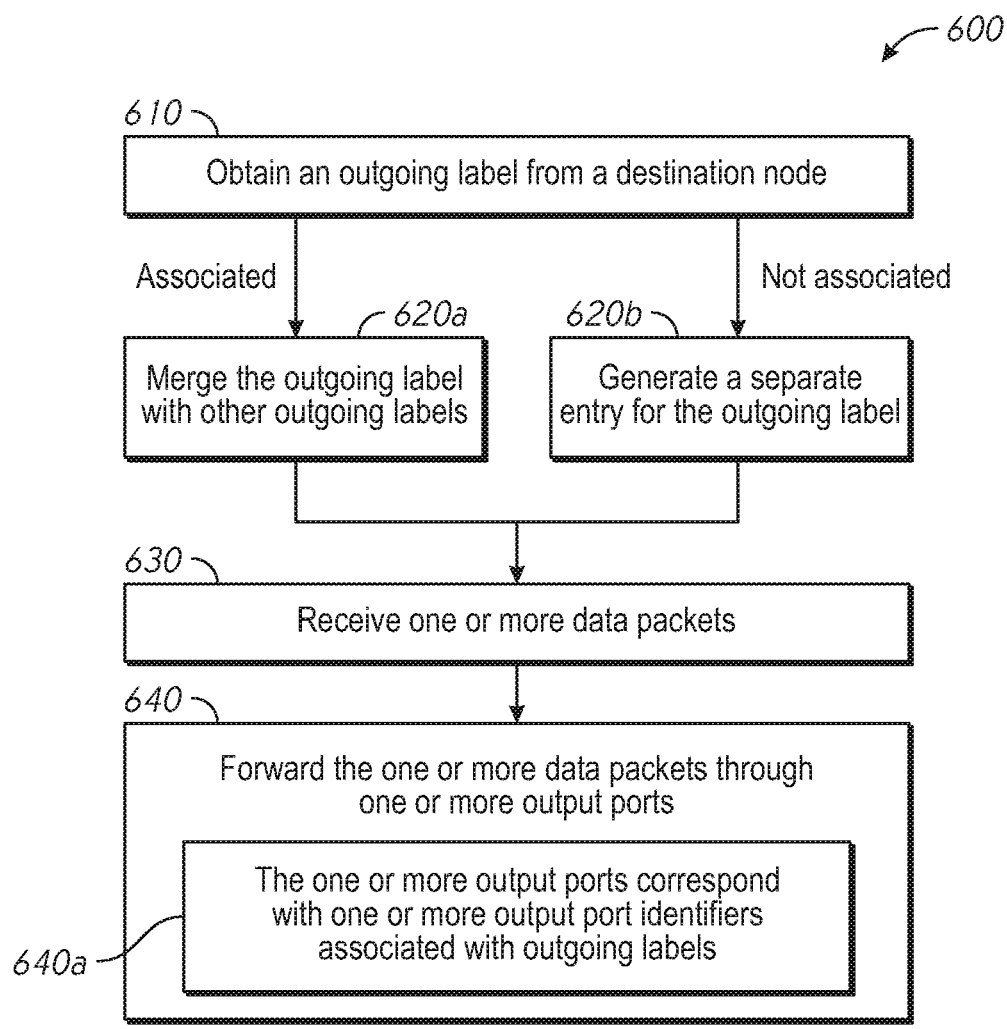
FIG. 6 is an illustration of a flowchart representation of a method of managing routing tables and data packet flow according to various embodiments.

FIG. 6 is an illustration of a flowchart representation of a method 600 of managing routing tables and data packet flow according to various embodiments. In various embodiments, the method 600 is performed by a networking device (e.g., the networking device 101 in FIG. 1) with a processor, a non-transitory memory, and a plurality of output ports. Briefly, the method 600 includes obtaining an outgoing label, merging the outgoing label with another outgoing label or creating a new entry for the outgoing label, and forwarding a data packet based on output ports associated with the outgoing label.

As represented by block 610, in various embodiments, the method 600 includes obtaining (e.g., retrieving) an outgoing label from a destination node. In various embodiments, the method 600 includes obtaining one or more outgoing labels from one or more destination nodes, either sequentially, concurrently, or by a combination thereof. In various embodiments, the destination node provides the outgoing label according to a border gateway protocol (BGP) (e.g., BGP-LU). For example, in some embodiments, the destination node provides a segment identifier (SID) for a BGP prefix. The SID can instruct the networking device to forward data packets over an ECMP best path, as computed by BGP. For example, in some embodiments, the destination node provides a segment identifier (SID) for an IGP prefix. The SID can instruct the networking device to forward data packets over an ECMP shortest path, as computed by an IGP. In various embodiments, the method 600 includes obtaining the outgoing label in the forwarding plane from a routing table in the control plane. In various embodiments, obtaining the outgoing label includes storing the outgoing label in a label table allocated in non-transitory memory at the networking device. The label table can be allocated contiguously and/or non-contiguously in the non-transitory memory.

According to various embodiments, the method 600 continues to block 620a or block 620b. The method 600 includes determining whether one or more output port identifiers associated with the outgoing label are also associated with other outgoing labels stored in the label table. In accordance with a determination that the one or more output port identifiers are also associated with the other outgoing labels, the method 600 continues to block 620*a*. In accordance with a determination that the one or more output port identifiers are not associated with the other outgoing labels, the method 600 continues to block 620*b*. For example, with reference to FIG. 5, the networking device identifies (e.g., examines) outgoing labels stored in the label table 205*a*. Continuing with this example, the networking device determines that that the outgoing labels stored in the label table 205*b* are associated with the same output port identifiers (if0-if3) associated with the outgoing labels stored in the label table 205*a*, and therefore continues to block 620*a*. As another example, the networking device determines that the outgoing labels stored in the label table 205*c* are associated with different output port identifiers (if0, if1, and if3) than are associated with the outgoing labels in the label table 205*a*, and therefore continues to block 620*b*.

As represented by block 620*a*, the method 600 includes merging into a next hop table the outgoing label with the other outgoing labels also associated with the output port identifiers. In various embodiments, merging includes populating the next hop table with addressing information corresponding to (e.g., representing) the outgoing labels. In some embodiments, merging includes populating the next hop table with addressing information identifying next hop nodes that are part of ECMP routes. With reference to FIG. 5, the networking device merges, into the next hop table 204*a*, the two entries associated with the label table 205*a* and label table 205*b*. Accordingly, utilization of the next hop table 204*a* is reduced because one entry is stored, in contrast to two entries that are stored by previous systems.

In various embodiments, as represented by block 620*b*, the method 600 includes populating the next hop table with separate entries for the outgoing label (e.g., non-merging). With reference to FIG. 5, the network device populates the next hop table 204*a* with an entry for the label table 205*c* because no other label tables include labels that are associated with the same set of output port identifiers. In various embodiments, method 600 includes storing, in the next hop table, address information corresponding to one or more output port identifiers. For example, in various embodiments, the method 600 includes storing, in the next hop table, address information corresponding to the set of one or more output port identifiers associated with outgoing label. Continuing with this example, the method 600 includes storing, in the next hop table, address information corresponding to the one or more output port identifiers associated with the other outgoing labels.

In various embodiments, as represented by block 630, the method 600 includes receiving one or more data packet. In various embodiments, a data packet is associated with an outgoing label stored in a label table at the networking device. In some embodiments, the header of a data packet includes the outgoing label. In some embodiments, a data packet includes a modified version of an outgoing label, such as an encoded outgoing label to be decoded at the networking device.

In various embodiments, as represented by block 640, the method 600 includes forwarding the one or more data packets through one or more output ports of the networking device. As represented by block 640*a*, in various embodiments, the one or more output ports are identified by one or more output port identifiers associated with outgoing labels (e.g., stored in the next hop table). In some embodiments, a data packet is forwarded according to MPLS based on an outgoing label associated with the data packet. For example, with reference to FIG. 5, the networking device receives a data packet destined for the destination node 106-1. Consequently, the networking device identifies the label table 205*a* as corresponding to the destination node 106-1, and identifies the entries if0-if3 in the next hop table 204*a*. Accordingly, the data packet can be forwarded through one or more output ports identified by the output port identifiers if0-if3. Continuing with this example, in some embodiments, each of the one or more output ports couples the networking device to a next hop node that is part of an equal-cost path to the destination node 106-1.

In various embodiments, the method 600 includes proceeding back to block 610, wherein the method 600 includes obtaining another outgoing label. In some embodiments, the other outgoing label is obtained from a different destination node. In some embodiments, the other outgoing label is obtained from the same destination node, in response to, for example, a change to a network configuration.

Figure 7:
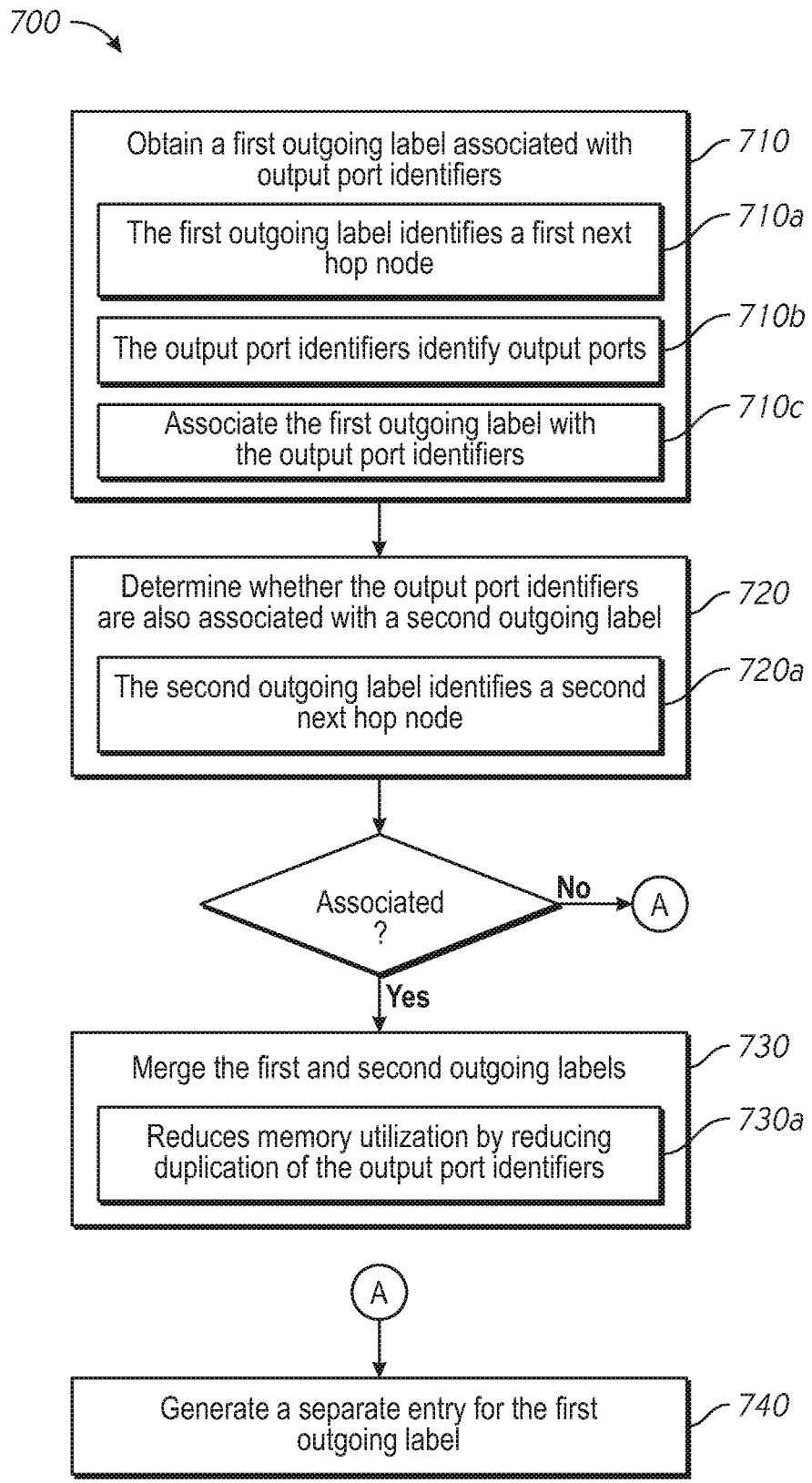
FIG. 7 is an illustration of a flowchart representation of a method of managing routing tables and data packet flow according to various embodiments.

FIG. 7 is an illustration of a flowchart representation of a method 700 of managing routing tables and data packet flow according to various embodiments. In various embodiments, the method 700 is performed by a networking device (e.g., the networking device 101 in FIG. 1) with a processor, a non-transitory memory, and a plurality of output ports. Briefly, the method 700 includes obtaining an outgoing label, associating the outgoing label with output port identifiers, and merging the outgoing label with another outgoing label in accordance with a determination that the other outgoing label shares the output port identifiers associated with the outgoing label. Merging the outgoing label with the other outgoing label reduces memory utilization by reducing duplication of the output port identifiers.

As represented by block 710, the method 700 includes obtaining, at the networking device, a first outgoing label associated with one or more output port identifiers of the networking device. As represented by block 710*a*, the first outgoing label identifies a first destination node. As represented by block 710*b*, the one or more output port identifiers identify one or more of the plurality of output ports.

In various embodiments, as represented by block 710*c*, the method 700 includes associating the first outgoing label with the one or more output port identifiers. The one or more output port identifiers identify one or more output ports that couple the networking device to one or more next hop nodes. In various embodiments, each of the one or more next hop nodes is part of an ECMP to a destination node. In various embodiments, the networking device associates the outgoing label according to principles of source routing, segment routing, LDP, RSVP-TE, and/or ECMP. For example, with reference to the label table 205*a* in FIG. 5, the networking device associates the outgoing label obtained from the destination node 106-2 with four output port identifiers if0-if3. Continuing with this example, the four output port identifiers if0-if3 identify four output ports coupling the networking device to four next hop nodes. Continuing with this example, the four next hop nodes can include any four of the next hop nodes 106-1 through 106-M in FIG. 1. Continuing with this example, in ECMP deployments, the port identifiers if0-if3 identify four output ports coupling the networking device to four next hop nodes lying on equal cost paths to the destination node 106-2.

As represented by block 720, the method 700 includes determining whether or not the one or more output port identifiers are also associated with a second outgoing label. As represented by block 720*a*, the second outgoing label identifies a second destination node different from the first destination node. In various embodiments, the first and second outgoing labels share a label value.

In response to determining that the one or more output port identifiers are also associated with the second outgoing label, the method 700 continues to block 730. As represented by block 730, the method 700 includes merging, into a next hop table allocated in the non-transitory memory, the first outgoing label with the second outgoing label in response to determining that the one or more output port identifiers are also associated with the second outgoing label. As represented by block 730a, the merging reduces utilization of the non-transitory memory by the next hop table by reducing duplication of the one or more output port identifiers.

In response to determining that the one or more output port identifiers are not also associated with the second outgoing label, the method 700 continues to block 740. As represented by block 740, the method 700 includes generating, in the next hop table, a separate entry corresponding to the first outgoing label.

Figure 8:
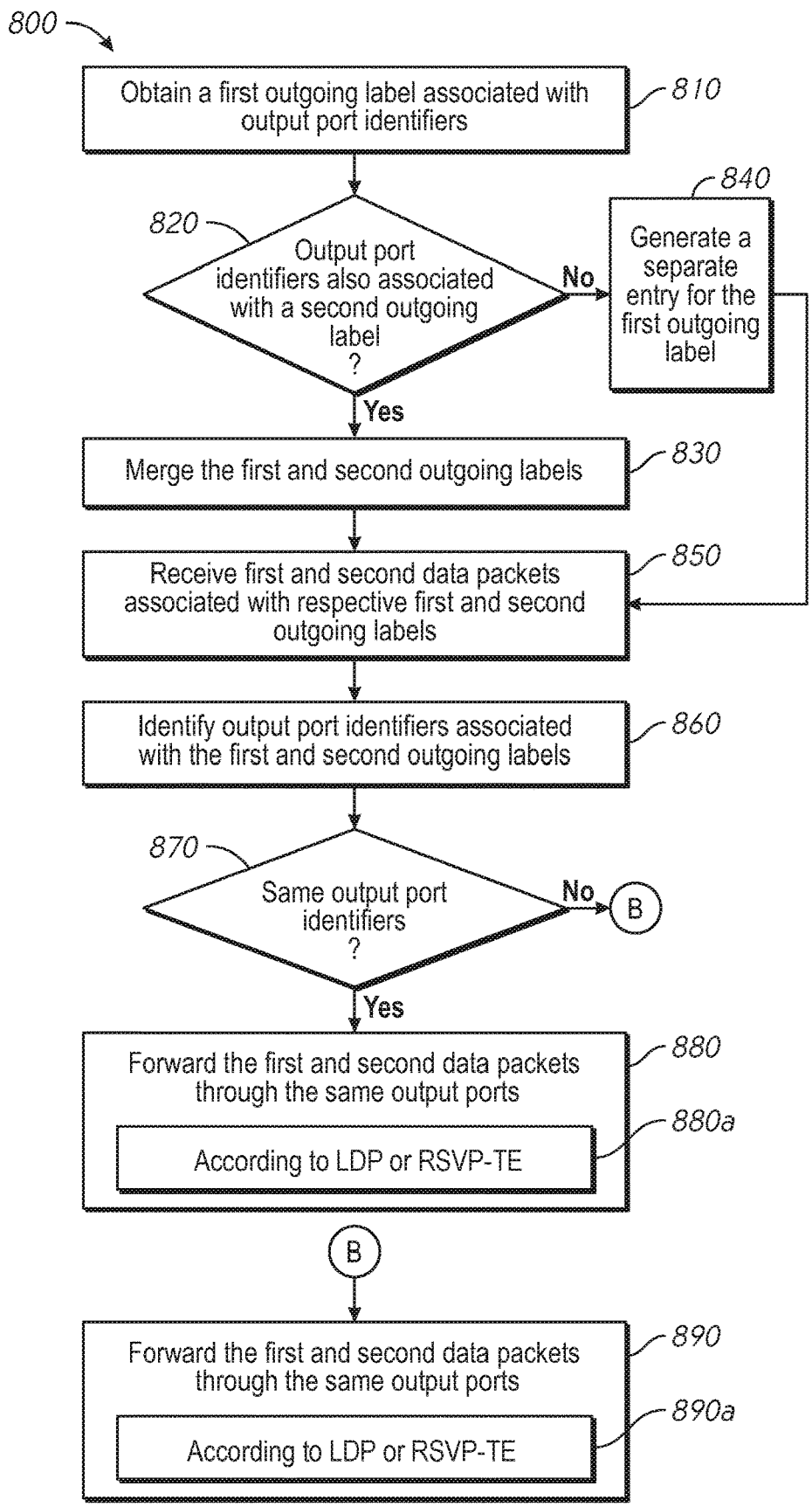
FIG. 8 is an illustration of a flowchart representation of a method of managing routing tables and data packet flow according to various embodiments.

FIG. 8 is an illustration of a flowchart representation of a method 800 of managing routing tables and data packet flow according to various embodiments. In various embodiments, the method 800 is performed by a networking device (e.g., the networking device 101 in FIG. 1) with a processor, a non-transitory memory, and a plurality of output ports. Briefly, the method 800 includes obtaining an outgoing label and merging the outgoing label with another outgoing label or creating a new entry for the outgoing label. First and second data packets are forwarded through output ports according to whether the outgoing label was merged or entered anew.

As represented by block 810, the method 800 includes obtaining, at the networking device, a first outgoing label associated with one or more output port identifiers of the networking device. As represented by block 820, the method 800 determines whether the one or more output port identifiers are also associated with a second outgoing label. In various embodiments, the first and second outgoing labels share a label value. In response to determining that the one or more output port identifiers are also associated with the second outgoing label, the method 800 continues to block 830. As represented by block 830, the method 800 includes merging the first and second outgoing labels. In response to determining that the one or more output port identifiers are not also associated with the second outgoing label, the method 800 continues to block 840. As represented by block 840, the method 800 includes generating, in the next hop table, a separate entry corresponding to the first outgoing label.

The method 800 continues to block 850. As represented by block 850, in various embodiments, the method 800 includes receiving first and second data packets associated with respective first and second outgoing labels. In some embodiments, as represented by block 850, the method 800 includes receiving, at the networking device, a first data packet associated with the first outgoing label; and receiving, at the networking device, a second data packet associated with the second outgoing label.

As represented by block 860, in various embodiments, the method 800 includes identifying output port identifiers associated with the first and second outgoing labels. In some embodiments, as represented by block 860, the method 800 includes identifying, from the next hop table, a set of one or more output port identifiers associated with both the first outgoing label and the second outgoing label. In some embodiments, as represented by block 860, the method 800 includes identifying, from the next hop table, a first set of one or more output port identifiers associated with the first outgoing label and a second set of one or more output port identifiers associated with the second outgoing label.

As represented by block 870, in various embodiments, the method 800 includes determining whether the first outgoing label and the second outgoing label share corresponding output port identifiers. In various embodiments, in response to determining that the first outgoing label and the second outgoing label share corresponding output port identifiers, method 800 continues to block 880. As represented by block 880, in various embodiments, the method 800 includes forwarding the first and second data packets through the same output ports. As represented by block 880, in some embodiments, the method 800 includes forwarding the first data packet and the second data packet through one or more of the plurality of output ports corresponding to the set of one or more output port identifiers associated with both the first outgoing label and the second outgoing label. As represented by block 880a, in some embodiments, the method 800 includes forwarding the data packets according to at least one of label distribution protocol (LDP) or resource reservation protocol-traffic engineering (RSVP-TE), based on an outgoing label associated with the data packet.

In various embodiments, in response to determining that the first outgoing label and the second outgoing label share corresponding output port identifiers, method 800 continues to block 890. As represented by block 890, in various embodiments, the method 800 includes forwarding the first and second data packets through different output ports. As represented by block 890, in some embodiments, the method 800 includes: forwarding the first data packet through one or more of the plurality of output ports corresponding to the first set of one or more output port identifiers associated with the first outgoing label; and forwarding the second data packet through one or more of the plurality of output ports corresponding to the second set of one or more output port identifiers associated with the second outgoing label. As represented by block 890a, in some embodiments, the method 800 includes forwarding the data packets according to at least one of label distribution protocol (LDP) or resource reservation protocol-traffic engineering (RSVP-TE), based on an outgoing label associated with the data packet.

Figure 9:
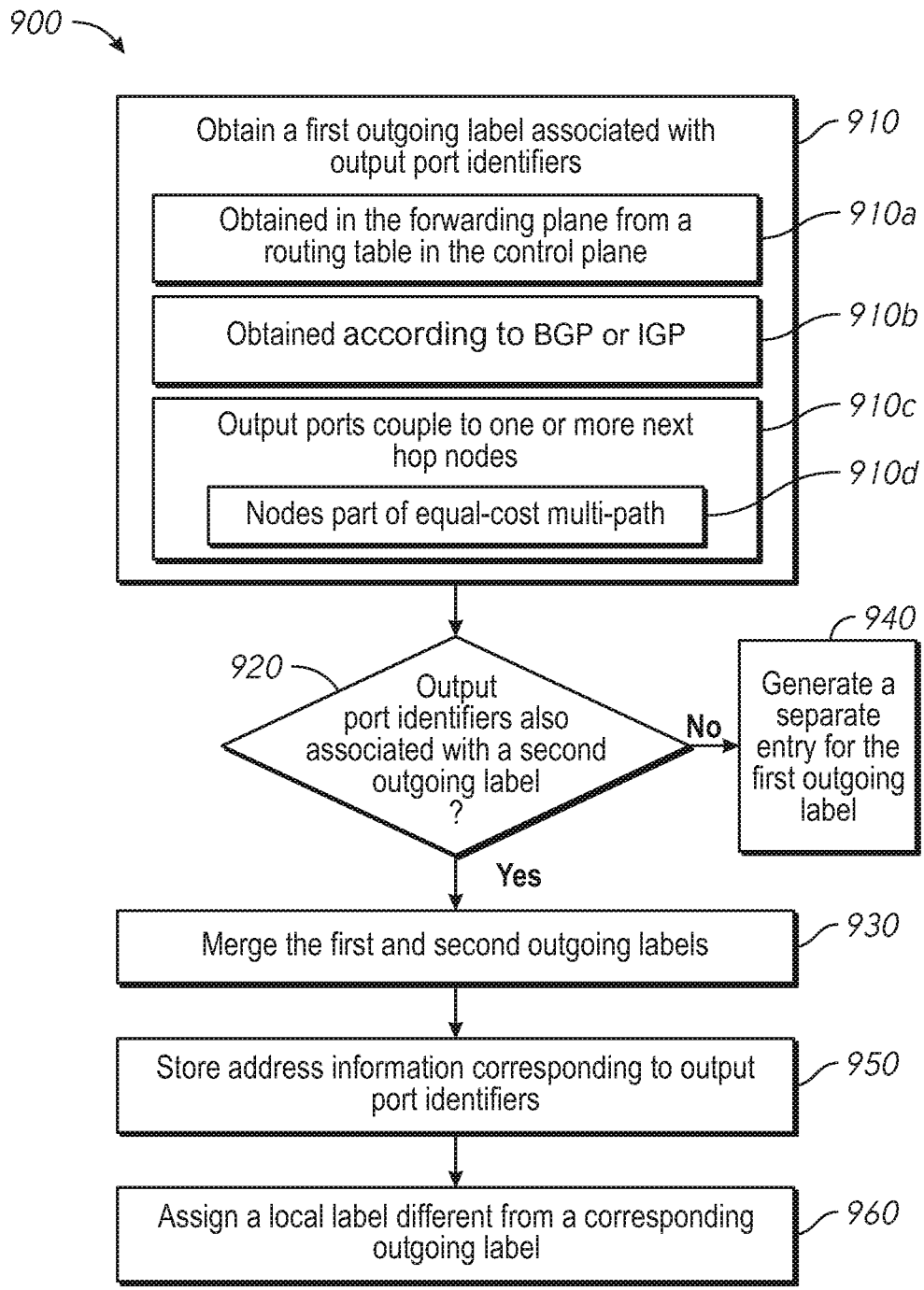
FIG. 9 is an illustration of a flowchart representation of a method of managing routing tables and data packet flow according to various embodiments.

FIG. 9 is an illustration of a flowchart representation of a method 900 of managing routing tables and data packet flow according to various embodiments. In various embodiments, the method 900 is performed by a networking device (e.g., the networking device 101 in FIG. 1) with a processor, a non-transitory memory, and a plurality of output ports. Briefly, the method 900 includes obtaining an outgoing label according to various protocols, merging the outgoing label with another outgoing label or creating a new entry for the outgoing label, and storing associated addressing information. Unlike in method 800, the method 900 includes assigning a local label that is different from a corresponding outgoing label. The local label can be used in conjunction with the outgoing label in order to make forwarding decisions.

As represented by block 910, the method 900 includes obtaining, at the networking device, a first outgoing label associated with one or more output port identifiers of the networking device. As represented by block 910a, in some embodiments, the method 900 includes obtaining the first outgoing label in the forwarding plane from a routing table in the control plane. As represented by block 910b, in some embodiments, the first outgoing label is obtained from a destination node according to at least one of BGP or IGP. In some embodiments, BGP corresponds to BGP-labeled unicast (BGP-LU). In some embodiments, BGP includes segment routing extensions (e.g., BGP-SR).

As represented by block 910c, in some embodiments, the one or more of the plurality of output ports of the networking device couple the networking device to one or more respective next hop nodes. As represented by block 910d, in some embodiments, each respective next hop node is part of an equal-cost multi-path (ECMP) to a destination node.

As represented by block 920, the method 900 determines whether the one or more output port identifiers are also associated with a second outgoing label. In various embodiments, the first and second outgoing labels share a label value. In response to determining that the one or more output port identifiers are also associated with the second outgoing label, the method 900 continues to block 930. As represented by block 930, the method 900 includes merging the first and second outgoing labels. In response to determining that the one or more output port identifiers are not also associated with the second outgoing label, the method 900 continues to block 940. As represented by block 940, the method 900 includes generating, in the next hop table, a separate entry corresponding to the first outgoing label.

The method 900 continues to block 950. As represented by block 950, in various embodiments, the method 900 includes storing address information corresponding to output port identifiers. As represented by block 950, in some embodiments, the method 900 includes storing, in the next hop table, address information corresponding to the one or more output port identifiers associated with the first outgoing label; and storing, in the next hop table, address information corresponding to one or more output port identifiers associated with the second outgoing label.

As represented by block 960, in various embodiments, the method 900 includes assigning a local label different from a corresponding outgoing label. As represented by block 960, in some embodiments, the method 900 includes assigning, at the networking device, a local label that identifies a respective next hop node and a respective destination node. In some embodiments, the local label is different from a corresponding outgoing label that identifies the respective next hop node. For example, with reference to the label table 205b in FIG. 5, the networking device obtains an outgoing label from the destination node 106-2 and assigns a local label having a value of 25000. The local label can used in making data packet forwarding decisions.

Figure 10:
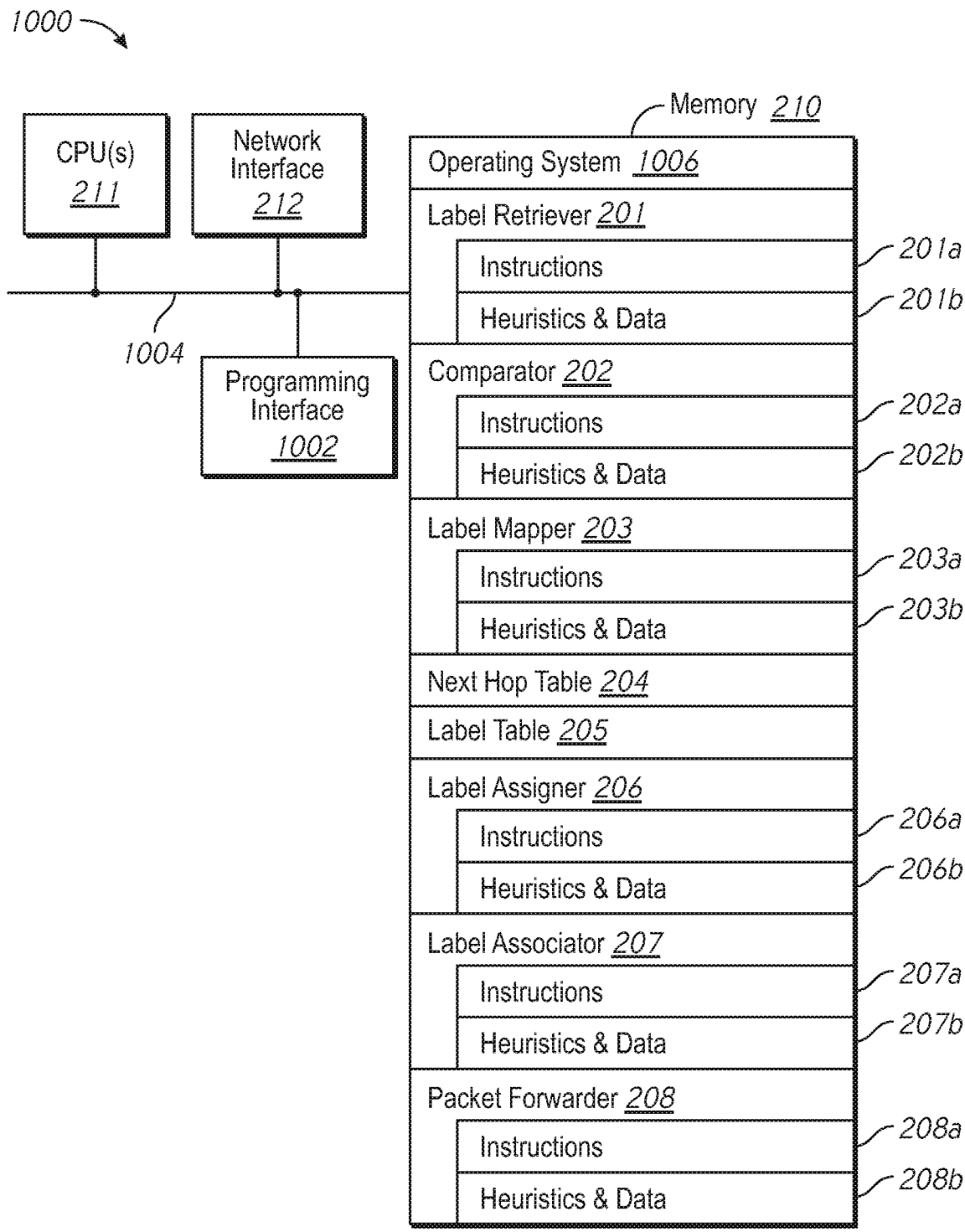
FIG. 10 is an illustration of a block diagram of an example of a networking device in accordance with various embodiments.

FIG. 10 is an illustration of a block diagram of an example of a networking device 1000 in accordance with various embodiments. For example, in some embodiments, the networking device 1000 is similar to and adapted from the networking device 101 in FIG. 1, the networking device 101A in FIG. 2A, and/or the networking device 101B in FIG. 2B. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the networking device 1000 includes one or more processing units (CPUs) 211, a memory 210, a network interface 212, a programming (I/O) interface 1002, and one or more communication buses 1004 for interconnecting these and various other components. In some embodiments, the one or more communication buses 1004 include circuitry that interconnects and controls communications between system components.

The memory 210 includes high-speed random access memory, such as DRAM, SRAM, DDR RAM, or other random access solid state memory devices. In some embodiments, the memory 210 includes non-volatile memory, such as one or more magnetic disk storage devices, optical disk storage devices, flash memory devices, or other non-volatile solid state storage devices. The memory 210 optionally includes one or more storage devices remotely located from the one or more CPUs 802. The memory 210 comprises a non-transitory computer readable storage medium. In some embodiments, the memory 210 or the non-transitory computer readable storage medium of the memory 210 stores the following programs, modules and data structures, or a subset thereof including an optional operating system 1006, a label retriever 201, a comparator 202, a label mapper 203, a label assigner 206, a label associator 207, and a packet forwarder 208. The optional operating system 1006 includes procedures for handling various basic system services and for performing hardware dependent tasks. In various embodiments, the networking device 1000 allocates in memory 210 a next hop table 204 and a label table 205.

In various embodiments, the label retriever 201 is configured to obtain outgoing labels from destination nodes. In various embodiments, the label retriever 201 is configured to store outgoing labels in the label table 205. In various embodiments, the label retriever 201 is configured to assign a local label corresponding to an outgoing label into the label table 205. To that end, in various embodiments, the label retriever 201 includes instructions and/or logic 201a, and heuristics and data 201b.

In various embodiments, the comparator 202 is configured to determine whether or not the one or more output port identifiers are also associated with a second outgoing label, wherein the second outgoing label identifies a second destination node different from the first destination node. In various embodiments, the first and second outgoing labels share a label value. To that end, in various embodiments, the comparator 202 includes instructions and/or logic 202a, and heuristics and data 202b.

In various embodiments, the label mapper 203 is configured to map the outgoing labels stored in the label table 205 into entries of the next hop table 204. To that end, in various embodiments, the label mapper 203 includes instructions and/or logic 203a, and heuristics and data 203b.

In various embodiments, the label assigner 206 is configured to assign, in the label table 205, a local label that identifies a respective next hop node and a respective destination node. To that end, in various embodiments, the label assigner 206 includes instructions and/or logic 206a, and heuristics and data 206b.

In various embodiments, the label associator 207 is configured to associate the first outgoing label with the one or more output ports identifiers identifying one or more output ports of the networking device. To that end, in various embodiments, the label associator 207 includes instructions and/or logic 207a, and heuristics and data 207b.

In various embodiments, the packet forwarder 208 is configured to receive data packets and forward the data packets based on information stored in the next hop table 204. To that end, in various embodiments, the packet forwarder 208 includes instructions and/or logic 208a, and heuristics and data 208b.

Moreover, FIG. 10 is intended more as functional description of the various features which can be present in a particular embodiment as opposed to a structural schematic of the embodiments described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it is to be appreciated that the various features of embodiments described above may be embodied in a wide variety of forms and that any specific structure and/or function described above is merely illustrative. It is to be appreciated that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements are not be limited by these terms. These terms are only used to distinguish one element from another. For example, a first outgoing label could be termed a second outgoing label, and, similarly, a second outgoing label could be termed a first outgoing label, which changing the meaning of the description, so long as all occurrences of the "first outgoing label" are renamed consistently and all occurrences of the second outgoing label are renamed consistently. The first outgoing label and the second outgoing label are both outgoing labels, but they are not the same outgoing label.

What is claimed is:

1. A method comprising:
   obtaining, at a networking device, a first outgoing label associated with one or more output port identifiers of the networking device, wherein the first outgoing label identifies a first destination node, and wherein the one or more output port identifiers identify one or more output ports of a plurality of output ports of the networking device that couple the networking device to a first next hop node which provides a first path to the first destination node associated with the first outgoing label;
   determining, by performing a comparison in a label table comprising a plurality of outgoing labels, that the one or more output port identifiers are also associated with a second outgoing label, wherein the second outgoing label identifies a second destination node different from the first destination node; and
   merging, into a next hop table allocated in a memory of the networking device, the first outgoing label with the second outgoing label in response to determining that the one or more output port identifiers are also associated with the second outgoing label.

2. The method of claim 1, further comprising:
   receiving, at the networking device, a first data packet associated with the first outgoing label;
   receiving, at the networking device, a second data packet associated with the second outgoing label;
   identifying, from the next hop table, a set of one or more output port identifiers associated with both the first outgoing label and the second outgoing label; and
   forwarding the first data packet and the second data packet through a set of one or more output ports of the plurality of output ports corresponding to the set of one or more output port identifiers associated with both the first outgoing label and the second outgoing label.

3. The method of claim 1, further comprising:
   receiving, at the networking device, a first data packet associated with the first outgoing label;
   receiving, at the networking device, a second data packet associated with the second outgoing label;
   identifying, from the next hop table, a first set of one or more output port identifiers associated with the first outgoing label and a second set of one or more output port identifiers associated with the second outgoing label;
   forwarding the first data packet through a first set of one or more output ports of the plurality of output ports corresponding to the first set of one or more output port identifiers associated with the first outgoing label; and
   forwarding the second data packet through a second set of one or more output ports of the plurality of output ports corresponding to the second set of one or more output port identifiers associated with the second outgoing label.

4. The method of claim 1, further comprising:
   storing, in the next hop table, address information corresponding to the one or more output port identifiers associated with the first outgoing label; and
   storing, in the next hop table, address information corresponding to one or more output port identifiers associated with the second outgoing label.

5. The method of claim 1, further comprising assigning, at the networking device, a local label that identifies a respective next hop node and a respective destination node, wherein the local label is different from a corresponding outgoing label that identifies the respective next hop node.

6. The method of claim 1, wherein the first outgoing label is obtained in the forwarding plane from a routing table in the control plane.

7. The method of claim 1, further comprising forwarding a data packet according to at least one of label distribution protocol (LDP) or resource reservation protocol-traffic engineering (RSVP-TE), based on an outgoing label associated with the data packet.

8. The method of claim 1, wherein the first outgoing label is obtained from the destination node according to at least one of border gateway protocol (BGP) or interior gateway protocol (IGP).

9. The method of claim 1, further comprising associating the first outgoing label with the one or more output port identifiers.

10. The method of claim 1, wherein the first next hop node is part of an equal-cost multi-path (ECMP) to the first destination node.

11. A non-transitory computer readable medium storing instructions, which, when executed by one or more processors of a networking device, cause the networking device to:
    obtain a first outgoing label associated with one or more output port identifiers of a networking device, wherein the first outgoing label identifies a first destination node, and wherein the one or more output port identifiers identify one or more output ports of a plurality of output ports of the networking device that couple the networking device to a first next hop node which provides a first path to the first destination node associated with the first outgoing label;

determine, by performing a comparison in a label table comprising a plurality of outgoing labels, that the one or more output port identifiers are also associated with a second outgoing label, wherein the second outgoing label identifies a second destination node different from the first destination node; and merge, into a next hop table allocated in a memory of the networking device, the first outgoing label with the second outgoing label in response to determining that the one or more output port identifiers are also associated with the second outgoing label.

12. The non-transitory computer readable medium of claim 11, wherein the instructions cause the networking device to:

receive a first data packet associated with the first outgoing label;

receive a second data packet associated with the second outgoing label;

identify, from the next hop table, a set of one or more output port identifiers associated with both the first outgoing label and the second outgoing label; and forward the first data packet and the second data packet through a set of one or more output ports of the plurality of output ports corresponding to the set of one or more output port identifiers associated with both the first outgoing label and the second outgoing label.

13. The non-transitory computer readable medium of claim 11, wherein the instructions cause the networking device to:

receive a first data packet associated with the first outgoing label;

receive a second data packet associated with the second outgoing label;

identify, from the next hop table, a first set of one or more output port identifiers associated with the first outgoing label and a second set of one or more output port identifiers associated with the second outgoing label;

forward the first data packet through a first set of one or more output ports of the plurality of output ports corresponding to the first set of one or more output port identifiers associated with the first outgoing label; and forward the second data packet through a second set of one or more output ports of the plurality of output ports corresponding to the second set of one or more output port identifiers associated with the second outgoing label.

14. The non-transitory computer readable medium of claim 13, wherein the first next hop node is part of an equal-cost multi-path (ECMP) to the first destination node.

15. The non-transitory computer readable medium of claim 11, wherein the instructions cause the networking device to:

store, in the next hop table, address information corresponding to the one or more output port identifiers associated with the first outgoing label; and store, in the next hop table, address information corresponding to one or more output port identifiers associated with the second outgoing label.

16. The non-transitory computer readable medium of claim 11, wherein the instructions cause the networking device to:

assign a local label that identifies a respective next hop node and a respective destination node, wherein the local label is different from a corresponding outgoing label that identifies the respective next hop node.

17. The non-transitory computer readable medium of claim 11, wherein the instructions cause the networking device to:

associate the first outgoing label with the one or more output port identifiers.

18. An apparatus, comprising:

a label retriever to obtain a first outgoing label associated with one or more output port identifiers of the apparatus, wherein the first outgoing label identifies a first destination node, and wherein the one or more output port identifiers identify one or more output ports of a plurality of output ports of the apparatus that couple the apparatus to a next hop node which provides a first path to the first destination node associated with the first outgoing label; and a comparator to determine, by performing a comparison in a label table comprising a plurality of outgoing labels, that the one or more output port identifiers are also associated with a second outgoing label, wherein the second outgoing label identifies a second destination node different from the first destination node; and a label mapper to merge, into a next hop table allocated in a memory of the apparatus, the first outgoing label with the second outgoing label in response to determining that the one or more output port identifiers are also associated with the second outgoing label.

19. The apparatus of claim 18, wherein the first next hop node is part of an equal-cost multi-path (ECMP) to the first destination node.

20. The apparatus of claim 18, wherein the first outgoing label is obtained from the first destination node based on at least one of the following: a border gateway protocol (BGP) and an interior gateway protocol (IGP).

* * * * *